United States Patent [19]

Rose et al.

[11] Patent Number: 5,103,720
[45] Date of Patent: Apr. 14, 1992

[54] SEPARATING APPARATUS

[75] Inventors: Wolfgang Rose, Eckhorst; Klaus Ziebell, Lübeck, both of Fed. Rep. of Germany

[73] Assignee: Nordischer Maschinenbau Rud. Baader GmbH & Co. KG, Lubeck, Fed. Rep. of Germany

[21] Appl. No.: 513,565

[22] Filed: Apr. 24, 1990

[30] Foreign Application Priority Data

Apr. 27, 1989 [DE] Fed. Rep. of Germany ... 8905305[U]

[51] Int. Cl.⁵ .................. A22C 17/04; B02C 18/28
[52] U.S. Cl. .................................. 99/495; 99/460;
99/464; 99/466; 100/72; 100/121; 100/153;
210/400; 210/783
[58] Field of Search .......... 99/495, 509, 510, 456–459,
99/460, 464; 100/121, 104, 136, 153, 152, 72;
452/198; 210/401, 400, 386, 783

[56] References Cited

U.S. PATENT DOCUMENTS

| 35,896 | 7/1862 | Rust | 100/153 |
| 2,106,409 | 1/1938 | Jenkins | 100/136 |
| 3,149,923 | 9/1964 | Hughes | 99/510 |
| 4,431,045 | 2/1984 | Josefsson | 100/153 |
| 4,475,453 | 10/1984 | Davis | 210/400 |
| 4,546,698 | 10/1985 | Bouvet | 99/509 |
| 4,697,511 | 10/1987 | Davis et al. | 210/783 |
| 4,819,811 | 4/1989 | Ewing et al. | 99/495 |
| 4,826,595 | 5/1989 | Franke | 100/121 |
| 4,861,495 | 8/1989 | Pietzsch | 210/401 |
| 4,948,467 | 8/1990 | Creagan | 100/153 |

FOREIGN PATENT DOCUMENTS

| 1036055 | 8/1958 | Fed. Rep. of Germany | 100/121 |
| 96155 | 3/1973 | Fed. Rep. of Germany | |
| 2159465 | 6/1973 | Fed. Rep. of Germany | |
| 0089000 | 7/1980 | Japan | 100/153 |

Primary Examiner—Timothy F. Simone
Attorney, Agent, or Firm—Morrison Law Firm

[57] ABSTRACT

An apparatus for separating of flowable and non-flowable constituents mixed with each other, particularly for the purpose of preparation of foodstuffs, operates with an elastic presser belt which is held pressed against the circumferential surface of a separating drum and which is guided between laterally bounding walls. For reducing the unavoidable leakage flow in the region of the radial sealing gap located between the perforated drum and the presser belt, the sealing gap is provided with a radial recess, which extends over the region of the separating drum encompassed by the presser belt and has an opening in the region of the entry wedge which connect said recess with this region.

4 Claims, 2 Drawing Sheets

1

SEPARATING APPARATUS

BACKGROUND OF THE INVENTION

1. Field of the Invention

The invention relates to an apparatus for separating flowable and non-flowable constituents mixed with each other, particularly for the purpose of preparation of foodstuffs.

Working in a continuous processing, such apparatuses serve, e.g. to obtain sausage stuffing for sausage production from a tendon-meat mixture, to mash or cream boiled potatoes, and to recover incorrectly packed butter and cheese, as well as contents of yoghurt cups, stated briefly, to carry out multiple mashing processes aside from the separating processes.

2. Prior Art

An apparatus serving these purposes can be taken e.g. from DL-PS 96 155 and includes at least a separating drum being driven to rotate and an elastic presser belt. The drum is formed as a hollow cylinder with a discharge end and has a perforated circumferential surface. The belt encompasses the separating drum on a part of its circumference, is arranged to be pressed against the circumferential surface through tensioning and presser means, rotates essentially synchronously with regard to said circumferential surface, and is guided between two side walls. It constitutes, together with the circumferential surface of the drum, an entry wedge into which the substance to be processed is delivered. This wedge is bounded laterally by means of the side walls, at least one of which is penetrated by the discharge end of the separating drum leaving a narrow sealing gap.

The method of operation of this apparatus is uncomplicated and the results thereof are excellent, however, a system-related, disadvantageous effect consists in that in the region of the hollow cylinder encompassed by the presser belt, losses due to leakage occur. The reason therefor is the quasi-hydraulic pressure on the material to be processed in this region, which pressure is produced between the separating drum and the pressure belt by the pressure of the latter on the separating drum, and leads to a non-avoidable lifting of the presser belt in its marginal regions and thus to a lateral draining of the material to be processed through the sealing gap between the separating drum and the side wall. The material escaping consequently beside the separating drum is so affected with regard to quality, that it can no longer be used.

In DE-PS 2 159 465, a measure is described which is, among other things, aimed at diminishing this loss. This measure lies in the arrangement of skid-shaped belt pressers in the marginal areas of the presser belt in the region in which the pressure belt encompasses the separating drum. Thus, a certain reduction of the leakage flow is achieved, however, the result is dissatisfactory with regard to the degree of improvement and also because now, increased belt wear occurs in the supporting regions of the belt pressers.

3. Objects of the Invention

It is the main object of the present invention to suggest a concept of an apparatus which effectively and substantially eliminates the leakage of material to be processed. Simultaneously, it is another major object of the invention to avoid that such concept has any negative influence on the wear behaviour of any machine parts.

SUMMARY OF THE INVENTION

In an apparatus comprising at least a separating drum being driven to rotate and formed as a hollow cylinder at least having one discharge end and a perforated circumferential surface; and an elastic presser belt, which encompasses the separating drum over a part of its circumference, which is arranged to be pressed against the circumferential surface through tensioning and presser means, rotates essentially synchronously with regard to said surface, is guided between two side walls, and constitutes, together with the circumferential surface of the separating drum, an entry wedge which can be charged with material to be processed and is bounded laterally by means of the side walls, at least one of said walls being penetrated by the discharge end of the separating drum leaving a narrow sealing gap, these objects are achieved in that an exterior surface bounding the sealing gap is provided with a channel designed as a radial groove or recess, which extends at least over the region in which the separating drum is encompassed by the presser belt and which has a break-through or opening in the region of the entry wedge to connect this region with said channel.

The advantages thus achieved consist particularly in that the material to be processed escaping laterally between the presser belt and the separating drum is virtually immediately, i.e. before the occurrence of damage, collected internally and guided such that it can be redirected, following the path of least resistance, into the pressure-free space in the region of the entry wedge. This effect is supplemented and assisted in that the surface formed by the corresponding part of the discharge end of the separating drum and bounding the sealing gap, as a result of its movement relative to the exterior surface, produces a conveying effect upon the material to be processed which has drained into the channel, which effect carries the material to be processed towards the opening in the region of the entry wedge.

According to an expedient embodiment of the invention, the channel can be helix-shaped, the outlet thereof forming the opening which connects said channel with the region of the entry wedge.

In another preferred embodiment the cross-section of the channel may be arranged to increase towards the opening connecting it with the region of the entry wedge. The thus obtainable advantage consists in that the flow resistance decreases towards the opening, thus contributing to further minimising of the remaining leakage.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE DRAWINGS

Figure 1:
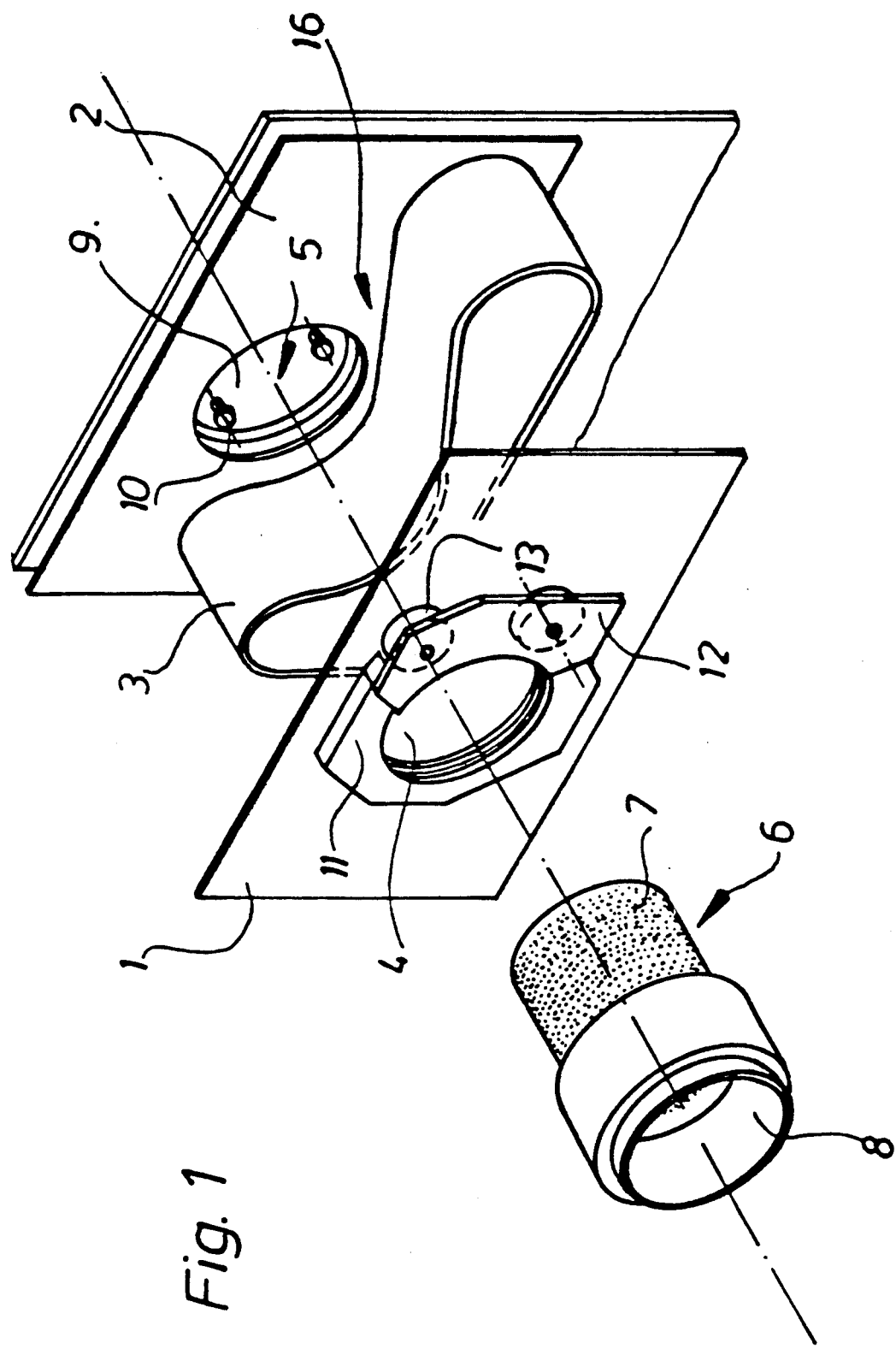
FIG. 1 shows, in axonometric break-down, an extremely simplified representation of the separating apparatus according to the invention.

For the purpose of clarity, in the illustration of FIG. 1, the frame, mounting, transmission, driving mechanism and presser belt deflection rollers are not shown. As is recognisable, there are two side walls 1 and 2, which have a space between them when in the operating position, said space corresponding to the width of a presser belt 3, and are each provided with a break-through 4 and 5, respectively, for receiving a separating drum 6. The separating drum 6 is provided with a perforated circumferential surface 7 in the region of the drum part which, in the mounted position, is located between the side walls 1 and 2, said perforated drum part being followed by a non-perforated drum part, which forms the discharge or delivery end 8 of the separating drum 6. The drum 6 is received by a merely hinted at drive flange 9 on the transmission side, and it is axially mounted by means of collar bolts 10 and radially fixed through torsion. On its discharging side, the drum 6 is guided in a flange segment 11 attached to the exterior surface of a side wall 1 and coaxially with regard to the break-through 4, the inner contour of said segment forming, together with the separating drum 6, a narrow sealing gap. The flange segment 11 is supplemented by a support element 12 to form a construction component which completely surrounds the separating drum 6, the supporting of the separating drum 6 following by means of two support rollers 13 which contact the circumferential surface of the discharge end of said drum. The presser belt 3 is of flexible material and manufactured as an endless belt and is guided by means of not-shown deflection rollers such that it lies on the circumferential surface 7 of the separating drum 6 while partially embracing said drum. In such arrangement, the deflection roller positioned at the highest level is designed to be adjustable in its distance from the separating drum 6, so that the presser belt 3 in this region can be pressed against the circumferential surface 7 of the separating drum 6 with the pressure being adjustable. The pressure component resulting therefrom is borne by the support rollers 13.

Figure 2:
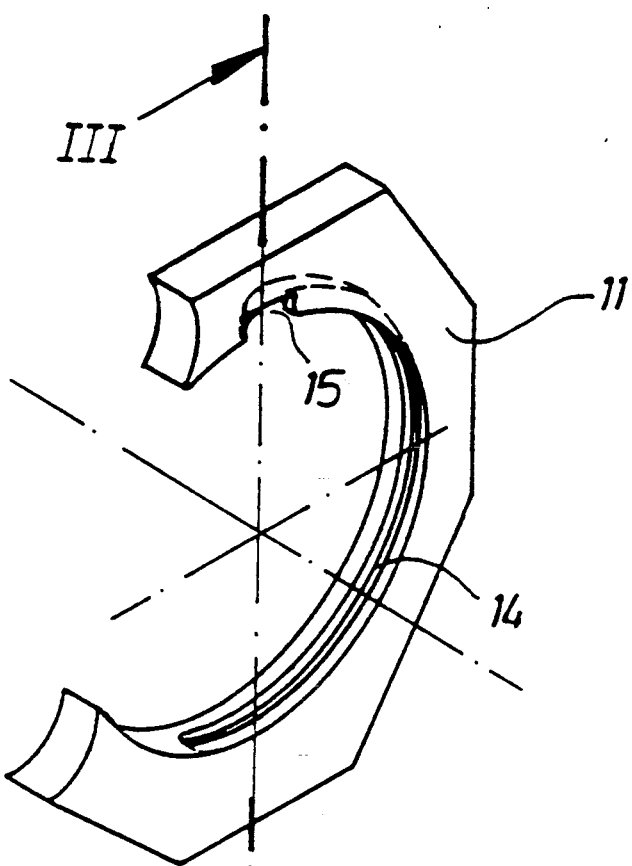
FIG. 2 shows the structural element substantially demonstrating the essence of the present invention, in axonometric illustration, observed from the rear side.
Figure 3:
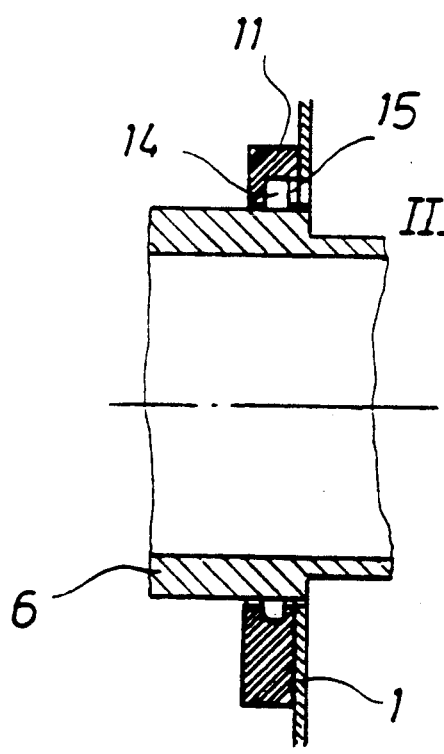
FIG. 3 shows a cross-section of the structural element according to FIG. 2, along the section line III—III.
Figure 4:
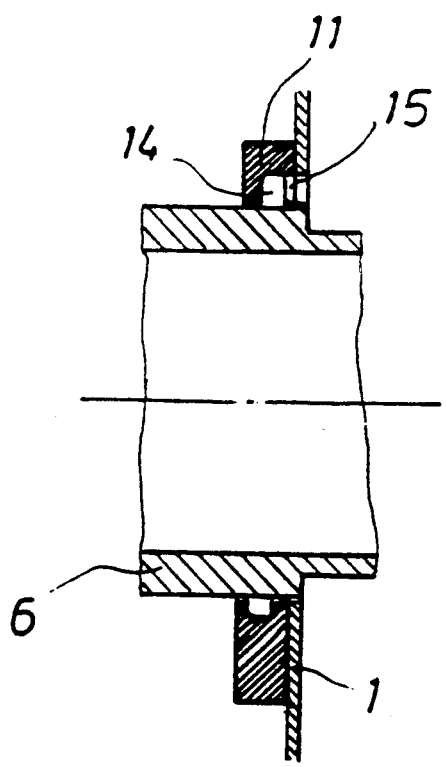
FIG. 4 shows a cross-section similar to FIG. 3 of a modified embodiment of the structural element.

The flange segment 11, as is best recognisable in FIGS. 2 and 3, is provided with a recess or cutout to its interior contour, which cutout is shaped to form a closed channel 14 in cooperation with the circumferential surface of the separating drum 6. The channel 14, approximately at its highest point, opens to the interior face of the flange segment 11 by means of a break-through or opening 15. Corresponding to the embodiment of FIG. 3, the channel 14 extends parallel to the exterior surfaces of the flange segment 11, whereas it is helix-shaped, according to the embodiment to be taken from FIG. 4.

In operation, the separating drum 6 and the not shown deflection roller which can be pressed against the drum are driven in a clockwise manner. The material to be processed, which has been introduced into the entry wedge 16 between the presser belt 3 and the separating drum 6, is supplied between these two components and subjected to an increasing pressure which reaches its peak in the region of the not-shown, pressure-charged deflection roller. At this time, the flowable constituents drain through the perforation of the circumferential surface 7 of the separating drum 6 into the interior thereof and can be removed by a not shown delivery screw or worm. As a result of the pressure charged onto the material to be processed, a leakage flow occurs in the marginal regions of the presser belt 3, which leakage seeks exit via the sealing gap between the flange segment 11 and the separating drum 6 past the latter. The leaking material being processed, however, thus encounters the channel 14, which offers a path of less flow resistance to the product, said channel then guiding, assisted by the revolving movement of the separating drum 6, the leaking material to the opening 15, through which it is returned to the pressureless region of the entry wedge 16.

What is claimed is:

1. An apparatus for the separating of flowable and non-flowable constituents mixed with each other, particularly for the purpose of preparation of foodstuffs, the apparatus comprising
    a) a separating drum driven to rotate and formed as a hollow cylinder, which at least has one discharge end and a perforated circumferential surface;
    b) elastic presser belt means, which encompass said separating drum over part of its circumference, are arranged to be pressed against said circumferential surface through tensioning and presser means, and rotate essentially synchronously with regard to said circumferential surface;
    c) side wall means between which said presser belt means are guided; and
    d) an entry wedge essentially defined by said presser belt means together with said circumferential surface of said separating drum, which entry wedge is arranged to be charged with the substance to be processed and is bounded laterally, by means of said side wall means, said side wall means at least on one side wall thereof being penetrated by said discharge end of said separating drum leaving a narrow sealing gap;

wherein
    e) channel means are provided in an exterior surface of said side wall means bounding said sealing gap, which channel means are designed in the form of a radial recess and extend at least over that part of said separating drum which is encompassed by said presser belt means; and
    f) an opening is provided in said channel means, which opening is located in the region of said entry wedge, and connects this region with said channel.

2. An apparatus as claimed in claim 1, wherein said channel means are helix-shaped, an outlet thereof forming said opening which connects said discharge end with said region of said entry wedge.

3. Apparatus as claimed in claim 1, wherein the cross-section of said channel means is arranged to increase in the direction of said opening connecting said channel means with said region of said entry wedge.

4. Apparatus as claimed in claim 2, wherein the cross-section of said channel means is arranged to increase in the direction of said opening connection said channel means with said region of said entry wedge.

* * * * *